(12) United States Patent
Shearin

(10) Patent No.: US 7,490,770 B2
(45) Date of Patent: Feb. 17, 2009

(54) SYSTEM AND METHOD OF OPTICAL READING WITH ENHANCED DEPTH OF FIELD COLLECTION

(75) Inventor: Alan Shearin, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 0 days.

(21) Appl. No.: 10/918,193

(22) Filed: Aug. 12, 2004

(65) Prior Publication Data

US 2006/0032919 A1 Feb. 16, 2006

(51) Int. Cl.
*G06K 7/10* (2006.01)
*G06K 9/36* (2006.01)
*G06K 9/80* (2006.01)
*G06K 7/14* (2006.01)

(52) U.S. Cl. .............. 235/454; 235/462.1; 235/462.11
(58) Field of Classification Search ............. 235/454, 235/455, 435, 439, 440, 472, 462.2, 462.21, 235/462.01, 462.41, 462.45, 491, 462.42, 235/467
See application file for complete search history.

(56) References Cited

U.S. PATENT DOCUMENTS

| | | | |
|---|---|---|---|
| 4,251,798 A | 2/1981 | Swartz et al. ............ 340/146.3 |
| 4,758,070 A | 7/1988 | Nishimoto .................. 350/379 |
| 4,818,886 A | 4/1989 | Drucker ....................... 250/566 |
| 4,877,949 A | 10/1989 | Danielson et al. ........... 235/462 |
| 5,202,784 A | 4/1993 | Reddersen .................. 359/196 |
| 5,210,398 A | 5/1993 | Metlisky ..................... 235/462 |
| 5,367,399 A * | 11/1994 | Kramer ....................... 359/206 |
| 5,475,207 A * | 12/1995 | Bobba et al. ............. 235/462.4 |
| 5,479,011 A | 12/1995 | Rudeen et al. .............. 250/235 |
| 5,627,366 A | 5/1997 | Katz .......................... 250/234 |
| 5,804,805 A * | 9/1998 | Koenck et al. ......... 235/462.01 |
| 5,814,803 A | 9/1998 | Olmstead .................... 235/462 |
| 5,900,611 A * | 5/1999 | Hecht .......................... 235/454 |
| 5,973,842 A * | 10/1999 | Spangenberg ............... 359/619 |
| 6,053,408 A | 4/2000 | Stoner |
| 6,056,198 A | 5/2000 | Rudeen et al. ......... 235/462.24 |
| 6,073,851 A * | 6/2000 | Olmstead et al. ....... 235/462.45 |
| 6,138,915 A * | 10/2000 | Danielson et al. ...... 235/472.02 |
| 6,273,336 B1 | 8/2001 | Rudeen et al. ......... 235/462.24 |

(Continued)

FOREIGN PATENT DOCUMENTS

GB 2 284 086 5/1995

OTHER PUBLICATIONS

Data Sheet for Zebex Z-6060 Omni-Directional Laser Scanner (no date); http://www.zbausa.com/z6060.asp, visited Dec. 2004.

(Continued)

*Primary Examiner*—Thien M. Le
*Assistant Examiner*—Thien T Mai
(74) *Attorney, Agent, or Firm*—Stoel Rives LLP

(57) ABSTRACT

Optical systems and methods of data reading with collection systems having improved depth of field. One configuration is directed to an image-based optical reading system with a plurality of sensor arrays, such as a charge coupled device (CCD) arranged in a compact configuration to minimize the overall package size while providing extended read range. In an example configuration, two CCD arrays are placed back to back to minimize height and overall package size with fold mirrors providing the optical path to a backward facing array.

31 Claims, 7 Drawing Sheets

U.S. PATENT DOCUMENTS

| | | | | |
|---|---|---|---|---|
| 6,290,135 | B1 | 9/2001 | Acosta et al. | 235/472.01 |
| 6,332,577 | B1 | 12/2001 | Acosta et al. | 235/472.01 |
| 6,433,907 | B1 * | 8/2002 | Lippert et al. | 359/201 |
| 6,578,765 | B2 | 6/2003 | Huss et al. | 235/454 |
| 6,585,161 | B1 | 7/2003 | Acosta | 235/462.4 |
| 6,601,768 | B2 * | 8/2003 | McCall et al. | 235/462.42 |
| 7,051,922 | B2 * | 5/2006 | Check et al. | 235/462.32 |
| 2003/0011745 | A1 * | 1/2003 | Molebny et al. | 351/215 |
| 2003/0222144 | A1 * | 12/2003 | Meier et al. | 235/454 |
| 2005/0205677 | A1 * | 9/2005 | Patel et al. | 235/454 |
| 2005/0211781 | A1 * | 9/2005 | Cannon et al. | 235/462.35 |

OTHER PUBLICATIONS

Data Sheet for Zebex Z-6060 Omni-Directional Laser Scanner (2002); downloaded from http://www.zbausa.com/pdf/z-6060.pdf, visited Dec. 2004.

User's Manual, Z-6060 Omni-Directional Laser Barcode Scanner Multi-Interface, ZBA Inc. (no date); excerpts pp. i-x, 1-2 and 277-283; downloaded from http://www.zbausa.com/manuals/z6060.pdf, visited Dec. 2004.

Data Sheet for Zebex CCD ID/2D Barcode Scanner Z-30XO Series (no date), http://www.zbausa.com/Z-30X0.asp, visited Jun. 21, 2004.

Data Sheet for Zebex CCD ID/2D Barcode Scanner Z-30X0 Series (no date), downloaded from http://www.zbausa.com/pdf/z-30X0.doc, visited Dec. 2004.

User's Manual Handheld Laser Scanner & High Performance Long Rang Dual CCD Scanner, Alpha-50 series; Alpha-60 series; Alpha-70 series, Zebex Industries, Inc. (Mar. 1999); downloaded from http://www.zbausa.com/manuals/Alpha-70.pdf, visited Dec. 2004.

Barcodes, Inc., Zebex Alpha-70 Scanner, http://www.barcodesinc.com/zebex/alpha-70.htm, visited Jun. 21, 2004.

Data Sheet for Zebex CCD Barcode Scanner ZB-8150, http://www.zbausa.com/zb-8150.asp, visited Jun. 21, 2004.

CCD Barcode Scanner Z-3080 Series, http://www.zbausa.com/Z-3080.asp, visited Jun. 21, 2004.

CCD Barcode Scanner ZB-8210, http://www.zbausa.com/zb-8210.asp, visited Jun. 21, 2004.

Danielson et al. U.S. Appl. No. 07/422,052 (Divisional of U.S. 4,877,949), filed Oct. 16, 1989.

Supplementary European Search Report for corresponding European Patent Application No. 05779598.1 dated Nov. 25, 2008.

* cited by examiner

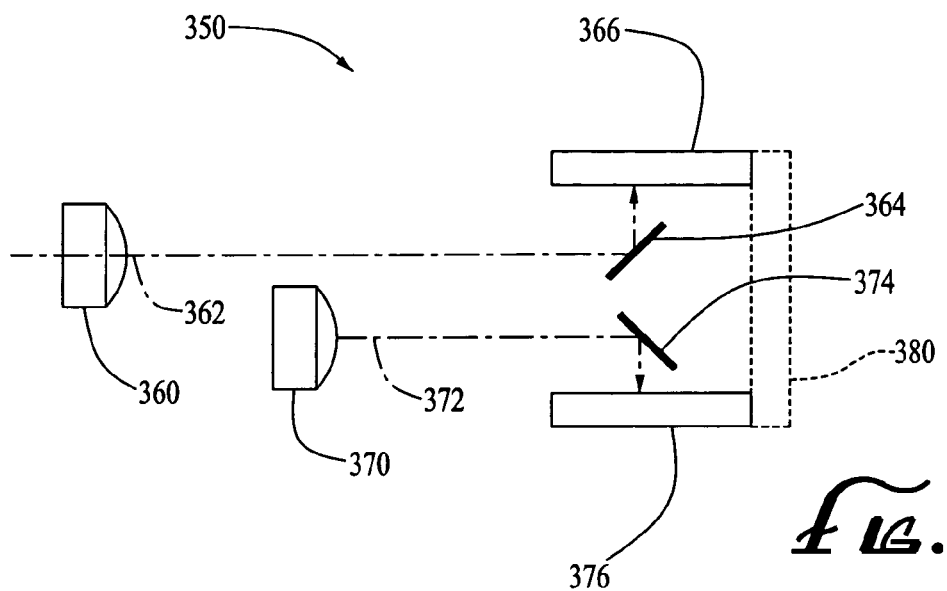
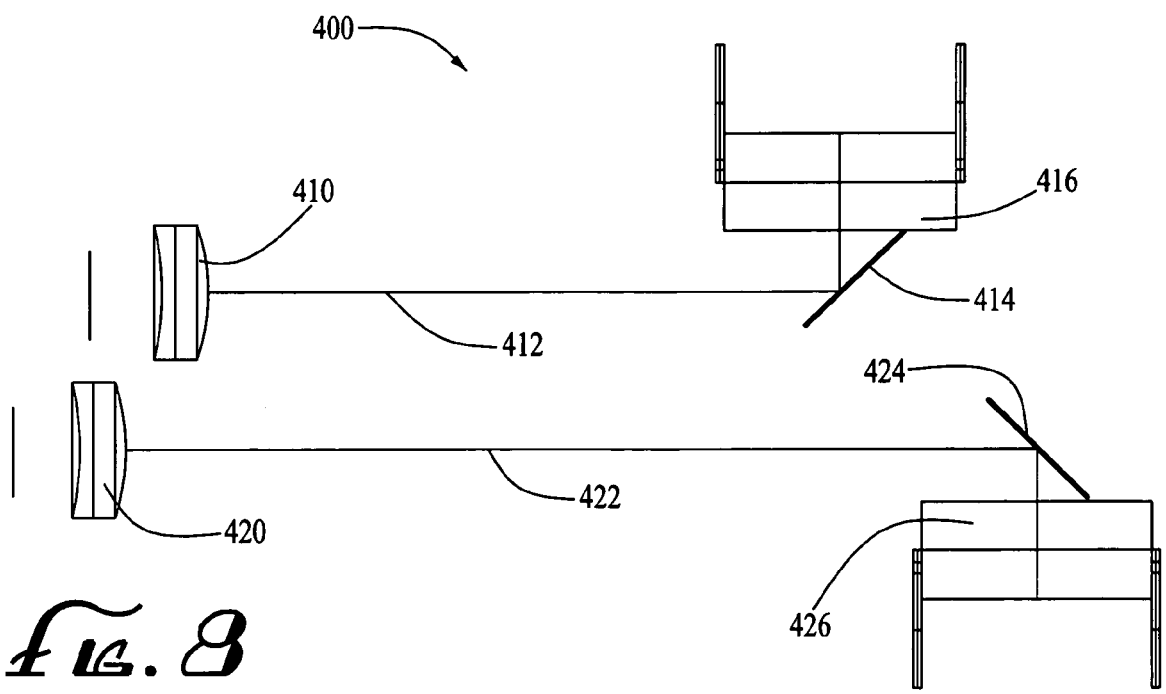

SYSTEM AND METHOD OF OPTICAL READING WITH ENHANCED DEPTH OF FIELD COLLECTION

BACKGROUND

The field of the present invention relates to data capture devices, such as scanners and optical code reading devices. In particular, optical readers and methods of reading are described herein which employ imaging technology to capture optical codes.

A common type of optical code is a barcode such as the omnipresent UPC label. A barcode label comprises a series of parallel dark bars of varying widths with intervening light spaces, also of varying widths. The information encoded in the barcode is represented by the specific sequence of bar and space widths, the precise nature of this representation depending on which particular barcode symbology is in use. Typical methods for reading barcodes comprise generation of an electronic signal wherein a signal voltage alternates between two preset voltage levels, one representing a dark bar and the other representing a light space. The temporal widths of these alternating pulses of high and low voltage levels correspond to the spatial widths of the bars and spaces. It is this temporal sequence of alternating voltage pulses of varying widths which is presented to an electronic decoding apparatus for decoding.

In one method of reading, referred to as "scanning," an illumination beam is moved (i.e., scanned) across the barcode while a photodetector monitors the reflected or backscattered light. For example, the photodetector may generate a high voltage when a large amount of light scattered from the barcode impinges on the detector, as from a light space, and likewise may produce a low voltage when a small amount of light scattered from the barcode impinges on the photodetector, as from a dark bar. The illumination source in spot scanners is a typically a laser, but may comprise a coherent light source (such as a laser or laser diode) or non-coherent light source (such as light emitting diode). A laser illumination source may offer advantages of higher intensity illumination which may allow barcodes to be read over a larger range of distances from the barcode scanner (large depth of field) and under a wider range of background illumination conditions.

Another method of reading is referred to as the "imaging" method whereby light reflecting off a surface is detected by an array of optical detectors, commonly a charge-coupled device (CCD) or CMOS. The scan surface is typically illuminated by some uniform light source, such as a light-emitting diode (LED), incandescent light, or laser illumination. Alternately, the illumination may be provided by ambient light such as disclosed in U.S. Pat. No. 5,814,803 hereby incorporated by reference. In such an imaging technique, as with a scanning laser, an electrical signal is generated having an amplitude determined by the intensity of the collected light.

In either the scanning laser or imaging technique, the amplitude of the electrical signal has one level for dark bars and a second level for light spaces. As the label is scanned, positive-going and negative-going transitions in the electrical signal occur, signifying transitions between bars and spaces. Techniques are known for detecting edges of bars and spaces by detecting the transitions of the electrical signal. Techniques are also known for determining the widths of bars and spaces based on the relative location of the detected edges and decoding the information represented by the bar code.

In data reading devices, a return light signal from the object or symbol being read is focused onto a detector or detector array. In the example of a data reader reading the bars and spaces of a typical bar code, there needs to be sufficient difference in signal intensity between the signal corresponding to the light space and the signal corresponding to the dark bar in order for the processor to differentiate therebetween. In either type of data reading system, depth of field plays an important role in effectively detecting the an image at the sensor. Thus in data reading applications there has been demand for increased depth of field, i.e., the range of distance over which the scanner can effectively scan.

There are several methods for improving depth of field, but there are essentially two areas which may be controlled, namely (1) outgoing beam generation and (2) collection. This application focuses on methods for improving depth of field and signal differentiation from the collection side.

SUMMARY OF THE INVENTION

The present invention is directed to data readers and methods of data reading with collection systems having improved depth of field.

A preferred embodiment is directed to an image-based optical reading system with a plurality of sensor arrays, such as a CCD or CMOS, arranged in a compact configuration to minimize the overall package size while providing extended read range. In one configuration, a data reader includes two separate CCD or CMOS arrays and optical paths produce the extended read range. In one arrangement, the CCD or CMOS arrays are placed back to back to minimize height and overall package size with fold mirrors providing the optical path to the backward facing array.

The foregoing and other objects, features, and advantages will become apparent from the following more detailed description set forth in conjunction with the accompanying drawings. It is intended that each of these disclosed embodiments may be implemented individually or in combination with other of the embodiments.

BRIEF DESCRIPTION OF THE DRAWINGS

FIG. 7 is a schematic diagram illustrating an imaging system according to another alternate embodiment.

FIG. 8 is a schematic diagram illustrating an imaging system according to another alternate embodiment.

DETAILED DESCRIPTION OF THE PREFERRED EMBODIMENTS

The preferred embodiments will now be described with reference to the drawings. For conciseness of description, the detector arrays are described as CCD arrays, but other suitable detectors may be implemented such as CMOS.

Figure 1:
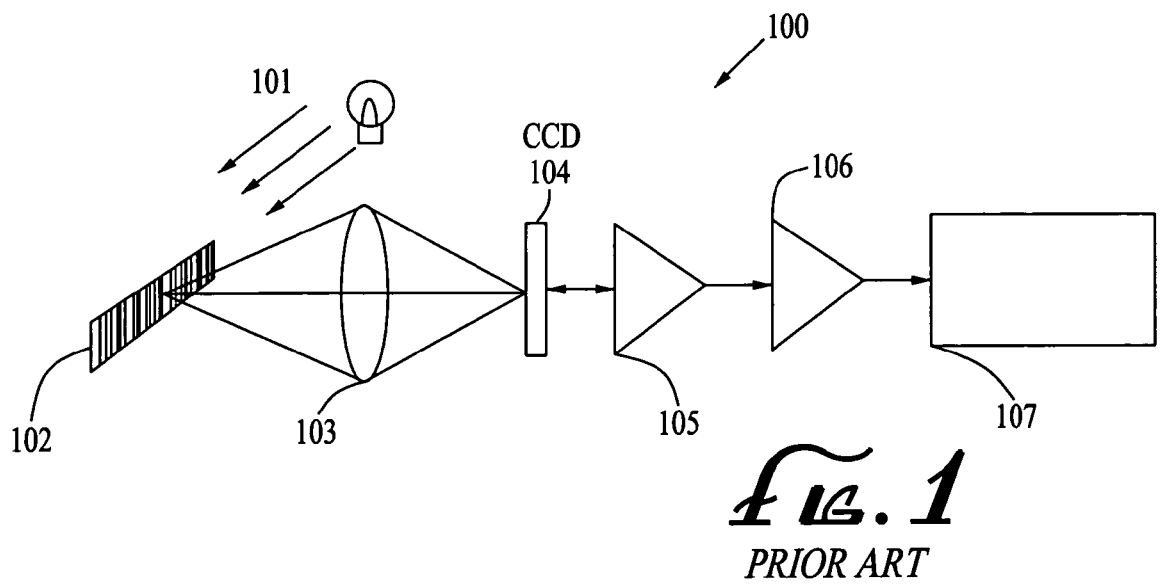
FIG. 1 is a schematic diagram showing a typical optical code scanning system.

FIG. 1 illustrates a typical imaging system 100 comprised of an optical collection system or lens 103, a CCD detector 104, a pre-amplification block 105, a signal processing block 106, and a decoding block 107. The optical collection system 103 operates in the presence of ambient illumination 101, gathering ambient light reflecting off a target (such as a bar code label 102) and focusing the gathered light on the CCD detector 104. Alternately, the system may be provided with an illumination system, such as one or more LED's (light emitting diodes). The CCD detector 104 interacts with the pre-amplification block 105 to obtain a CCD input signal comprised of imaging data. The CCD input signal may be processed by the signal processing block 106 and provided to the decoding block 107 for decoding.

Although the imaging region of the CCD detector 13 may be various shapes, a planar imaging surface is preferred. In contrast to a conventional retrodirective multi-line laser scanner having a laser and mirrors, the optical sensing portion of an area imaging system may be quite small because of the relatively small size of the CCD array.

Figure 2:
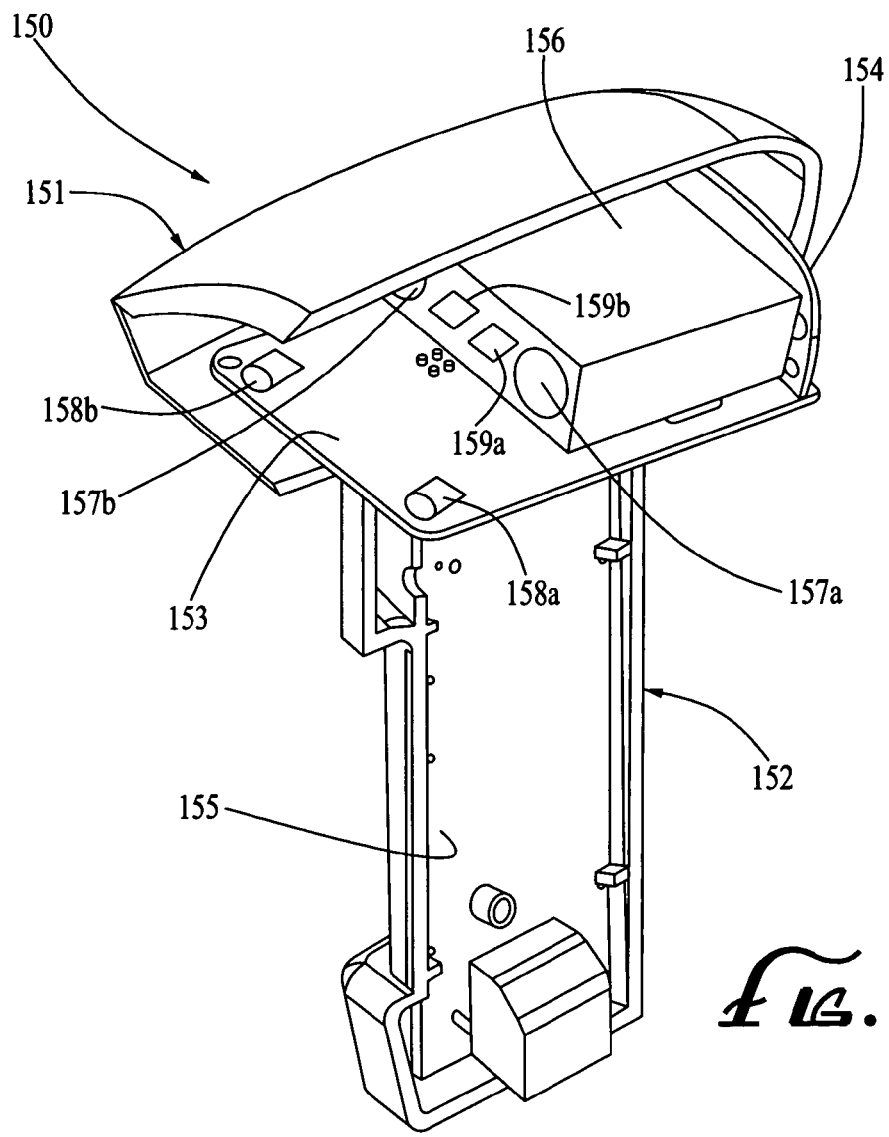
FIG. 2 is a cut-away view of a handheld data reader suitable for the systems of the preferred embodiments.

FIG. 2 is a cut-away view of a handheld data reader 150 of suitable configuration according to a preferred embodiment. The handheld data reader 150 comprises a head section 151 encasing most or all of the optical system and electronics, a digital board 153 on which is mounted an optics chassis 156, and an analog board 154 connected to the back of the optics chassis 156 and also connected to the digital board 153. The data reader 150 also includes a handle board 155 encased in a portion of the housing formed as a handle section 152 below the scan head section 151.

The left sections of the housing head section 151 and handle section 152 are removed and thus not shown in the figure. The data reader 150 may also include a window disposed in a front portion of the head section 151 for sealing off the interior space of the data reader where the various components are disposed but allowing light to pass therethrough.

The data reader may also be provided with an aiming mechanism. For example two pointer LED assemblies 157a, 157b are mounted on or in the optical chassis 156, each containing a pointer LED with suitable focusing/diffusing optics for projecting an aiming pattern into the read volume. The pointer LED projects an aiming pattern comprised of a spot, line segment, or image to assist the operator in aiming the reader so as to position the target being read at a desired location relative to the reader.

The data reader 150 preferably comprises an imaging system having a relatively large depth of field that can operate solely in ambient light. Alternately, the data reader 150 may employ illumination source(s) such as LED's 158a, 158b mounted on the PCB 153. Alternately, the illumination LED's may be mounted to some other suitable location such as the chassis 156 or the housing.

The data reader includes inlets 159a, 159b for the two CCD arrays that are arranged in a compact arrangement to minimize the overall package size. The two separate CCD arrays, arranged along separate optical paths produce the extended read range.

Preferably, each of the CCD arrays is two-dimensional array capable of acquiring a two-dimensional image. Such a imaging array is useful for reading one-dimensional codes such as UPC/EAN and Code 39, but is particularly useful for reading two-dimensional codes such as PDF-417, Maxicode, Datamatrix, Datastrip, RSS (Reduced Space Symbol), and Code 49.

Figure 3:
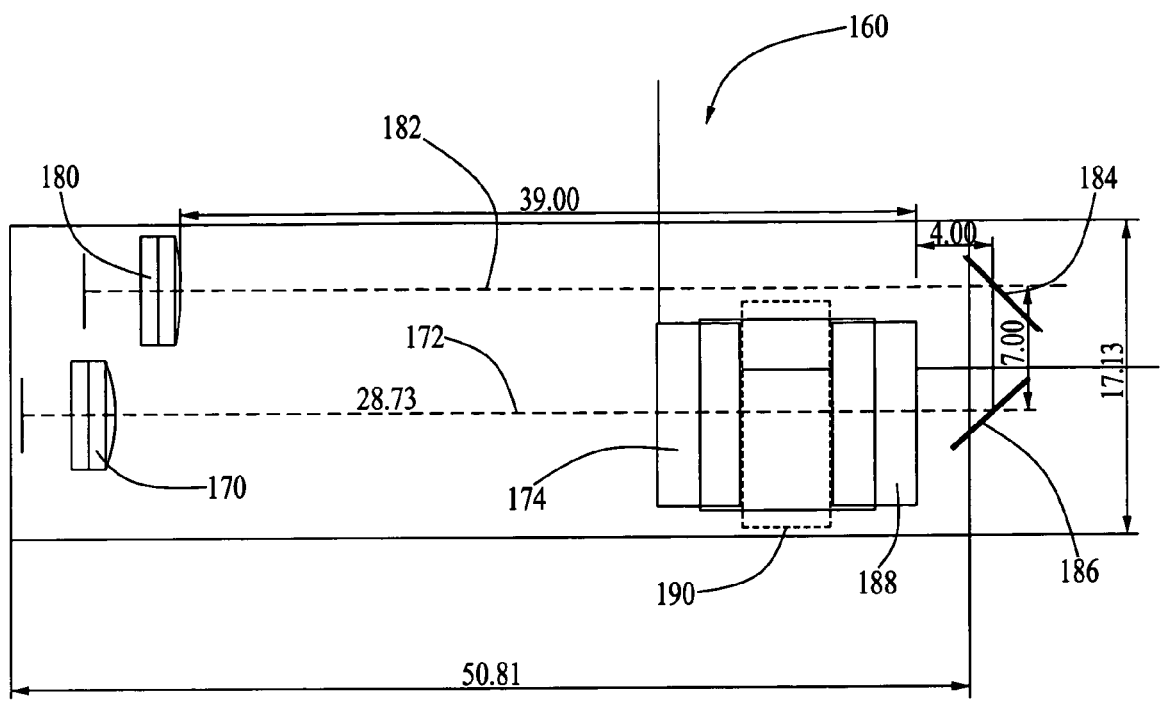
FIG. 3 is a schematic diagram illustrating an imaging system according to a preferred embodiment.

FIG. 3 illustrates a first embodiment of an optical system 160 having a first collection system, shown as a lens 170, that focuses an image along first incoming optical path 172 and onto the first CCD array 174. A second collection system, shown as a lens 180, focuses an image along a second incoming optical path 182 and toward a first fold mirror 184, then to second fold mirror 186, and then onto a second CCD array 188. The back-to-back arrangement of the first CCD array 174 and second CCD array 188 may minimize height and overall package size. The first and second CCD arrays 174, 188 may be mounted on a common substrate such as a chassis, or on opposite sides of a common printed circuit board 190 simplifying both mechanical construction and electrical connection.

The two optical paths 172, 182 and lens designs for the lens systems 170, 180 provide for two overlapping read ranges with both a wide angle and narrow angle field of view. The back-to-back placement shortens the overall length and provides some height reduction. The height reduction also minimizes the optical path offset, which should enhance smooth overlap between the two read ranges.

The two incoming optical paths 172, 182 are generally parallel, but offset from each other. The offset may be lateral, such as the configuration of FIG. 2, or may be some other arrangement such as vertical or diagonal.

In the back-to-back arrangement illustrated in FIG. 3, the respective sensors arrays 174, 188 face in opposite directions. In another configuration, the respective sensors arrays 174, 188 may be arranged to face in the same direction. In such a system, the first fold mirror 184 would reflect the incoming light 182 between the sensors arrays 174, 188 and second fold mirror 186 would be positioned between the sensors arrays 174, 188 for reflecting the incoming light 182 onto the second sensor array 188.

Figure 4:
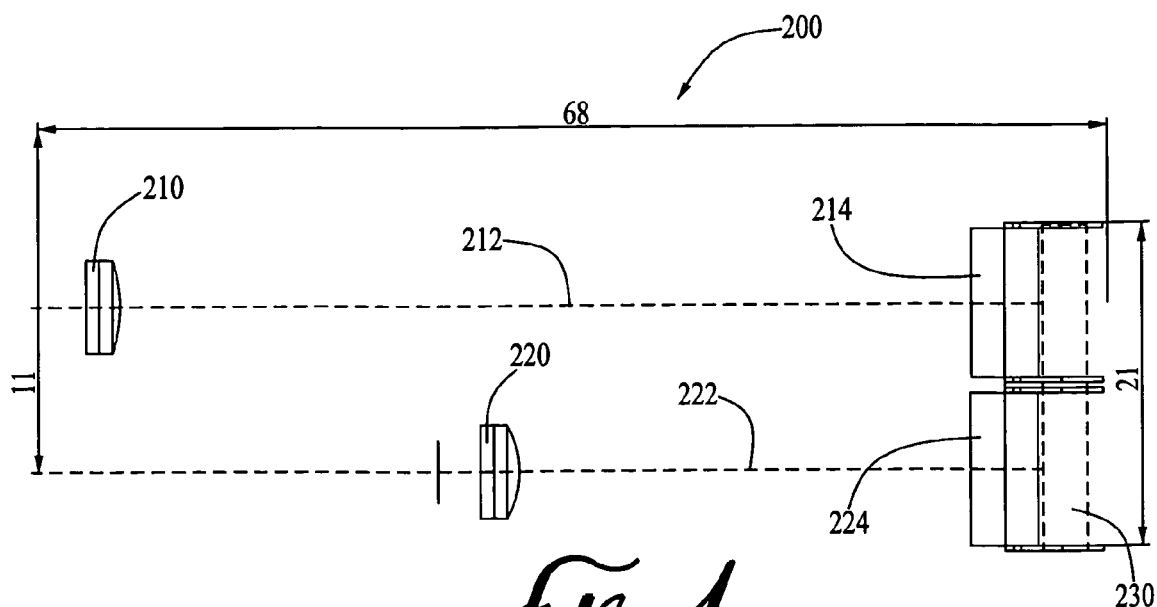
FIG. 4 is a schematic diagram illustrating an imaging system according to a alternate embodiment.

FIG. 4 illustrates an alternate embodiment of an optical system 200 having a first collection system, shown as a lens 210, that focuses an image along optical path 212 and onto the first CCD array 214. A second collection system, shown as a lens 220, focuses an image along optical path 222 and onto a second CCD array 224. The first CCD array 214 and second CCD array 224 are constructed in a side-by-side or in a stacked arrangement to provide for common mounting such as on a common PCB 230.

The back-to-back arrangement of two CCD arrays may be more compact than a stacked or side-by-side arrangement.

Figure 5:
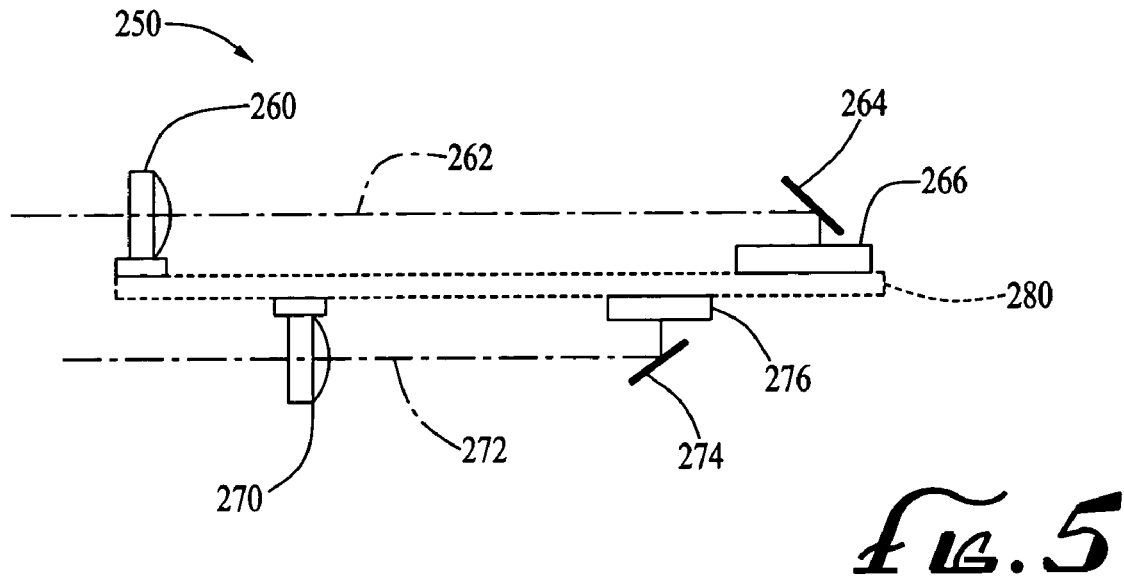
FIG. 5 is a schematic diagram illustrating an imaging system according to another alternate embodiment.

FIG. 5 illustrates another embodiment of an optical system 250 having a first collection system, shown as a lens 260, that focuses an image along first incoming optical path 262 and toward a first fold mirror 264 which in turn reflects the image onto the first CCD array 266. A second collection system, shown as a lens 270, focuses an image along a second incoming optical path 272 and toward a first fold mirror 274, which in turn reflects the image onto a second CCD array 276. The first CCD array 266 and second CCD array 276 are arranged facing in opposite directions perpendicular to the axes 262, 272 of the lenses 260, 270 to minimize height and overall package size. The first and second CCD arrays 266, 276 may be mounted on a common substrate such as a chassis, or on opposite sides of a common printed circuit board 280 simplifying both mechanical construction and electrical connection. The CCD arrays 266, 276 may aligned back-to-back or, as illustrated in FIG. 5, laterally offset. Further, the arrays may be disposed in offset, parallel planes as in FIG. 5, or may be configured in a common plane.

Figure 6:
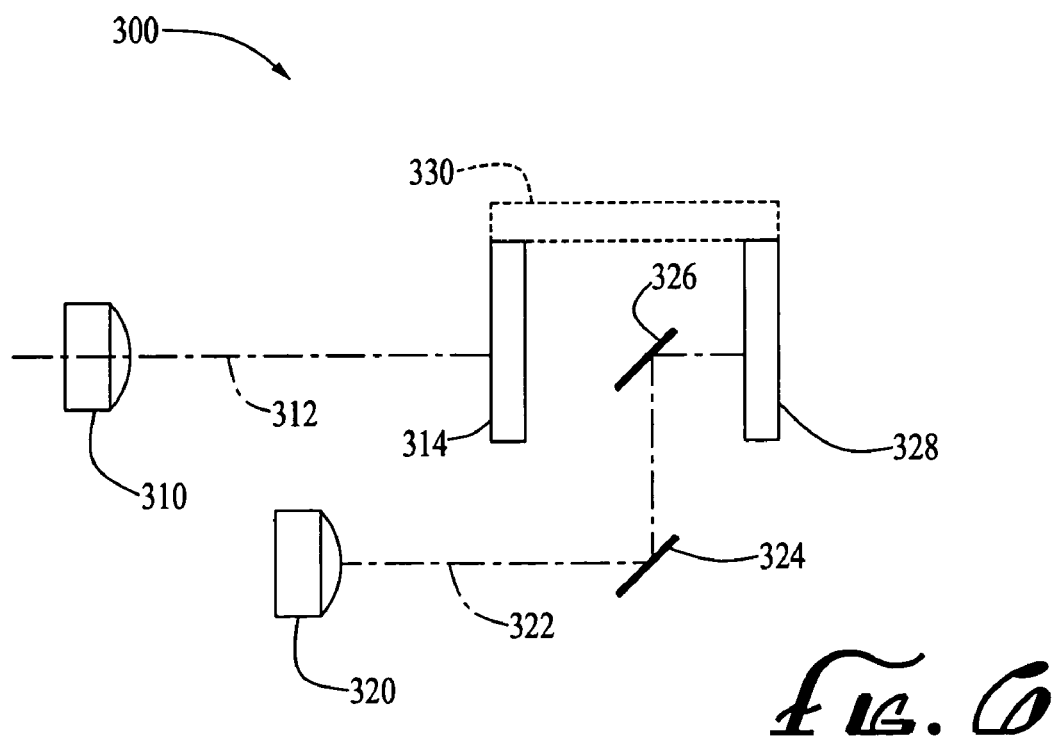
FIG. 6 is a schematic diagram illustrating an imaging system according to another alternate embodiment.

FIG. 6 illustrates another embodiment of an optical system 300 having a first collection system, shown as a lens 310, that focuses an image along first incoming optical path 312 and onto the first CCD array 314. A second collection system, shown as a lens 320, focuses an image along a second incoming optical path 322 and toward a first fold mirror 324, then to second fold mirror 326, and then onto a second CCD array 328. The first CCD array 314 and second CCD array 328 are arranged front-to-back separated by a gap within which the second fold mirror 326 is disposed. Such a configuration may minimize height and overall package size. The first and second CCD arrays 314, 328 may be mounted on a common substrate such as a chassis, or on a common printed circuit board 330 simplifying both mechanical construction and electrical connection.

FIG. 7 illustrates another embodiment of an optical system 350 having a first collection system, shown as a lens 360, that focuses an image along first incoming optical path 362, and toward a fold mirror 364 which reflects the image and onto the first CCD array 366. A second collection system, shown as a lens 370, focuses an image along a second incoming optical path 372 and toward a fold mirror 374, and then onto a second CCD array 376. The first CCD array 366 and second CCD array 376 are arranged face-to-face, facing in opposite directions, separated by a gap within which the fold mirrors 364, 374 are disposed. Such a configuration may minimize height and overall package size. The first and second CCD arrays 366, 376 may be mounted on a common substrate such as a chassis, or on a common printed circuit board 380 simplifying both mechanical construction and electrical connection.

FIG. 8 illustrates another embodiment of an optical system 400 having a first collection system, shown as a lens 410, that focuses an image along first incoming optical path 412, and toward a fold mirror 414 which reflects the image and onto the first CCD array 416. A second collection system, shown as a lens 420, focuses an image along a second incoming optical path 422 and toward a fold mirror 424, and then onto a second CCD array 426. The first CCD array 416 and second CCD array 426 are arranged facing in opposite directions, with offset axes providing different distances from the respective lenses 410, 420. The first and second CCD arrays 416, 426 may be mounted on a common substrate such as a chassis, or on a common printed circuit board (not shown) for simplifying both mechanical construction and electrical connection.

Figure 9:
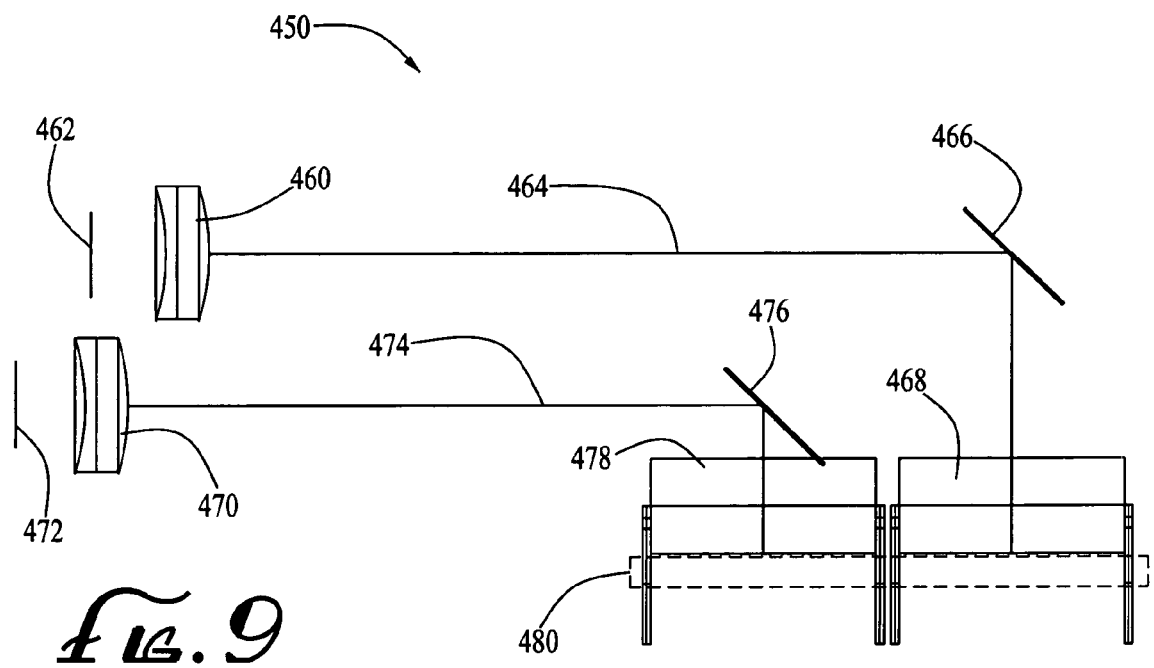
FIG. 9 is a schematic diagram illustrating an imaging system according to another alternate embodiment.

FIG. 9 illustrates another embodiment of an optical system 450 having a first collection system, shown as a lens 460, that focuses an image passing through aperture 462 along first incoming optical path 464 and toward a first fold mirror 466 which in turn reflects the image onto the first CCD array 468. A second collection system, shown as a lens 470, that focuses an image passing through aperture 472 along first incoming optical path 474 and toward a first fold mirror 476 which in turn reflects the image onto the first CCD array 478. The first CCD array 468 and second CCD array 478 are arranged facing in the same direction perpendicular to the axes 464, 474 of the lenses 460, 470 to minimize height and overall package size. The first and second CCD arrays 468, 478 may be mounted on a common substrate such as a chassis, or on opposite sides of a common printed circuit board 480 simplifying both mechanical construction and electrical connection. The CCD arrays 468, 478 may aligned side-by-side in a common plane.

Figure 10:
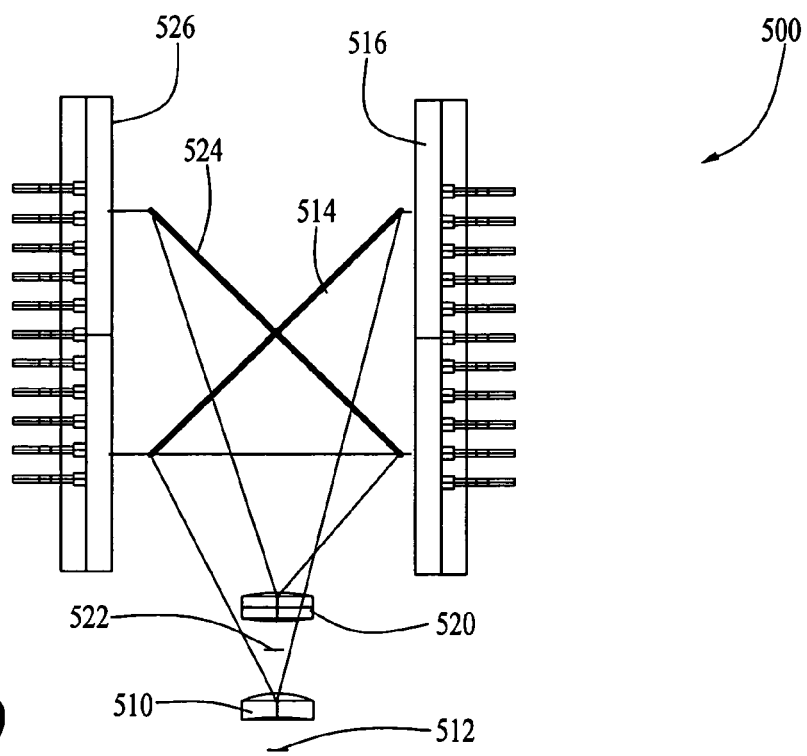
FIGS. 10-11 are schematic diagrams illustrating an imaging system according to another alternate embodiment, FIG. 10 being a top view and FIG. 11 being a perspective view.
Figure 11:
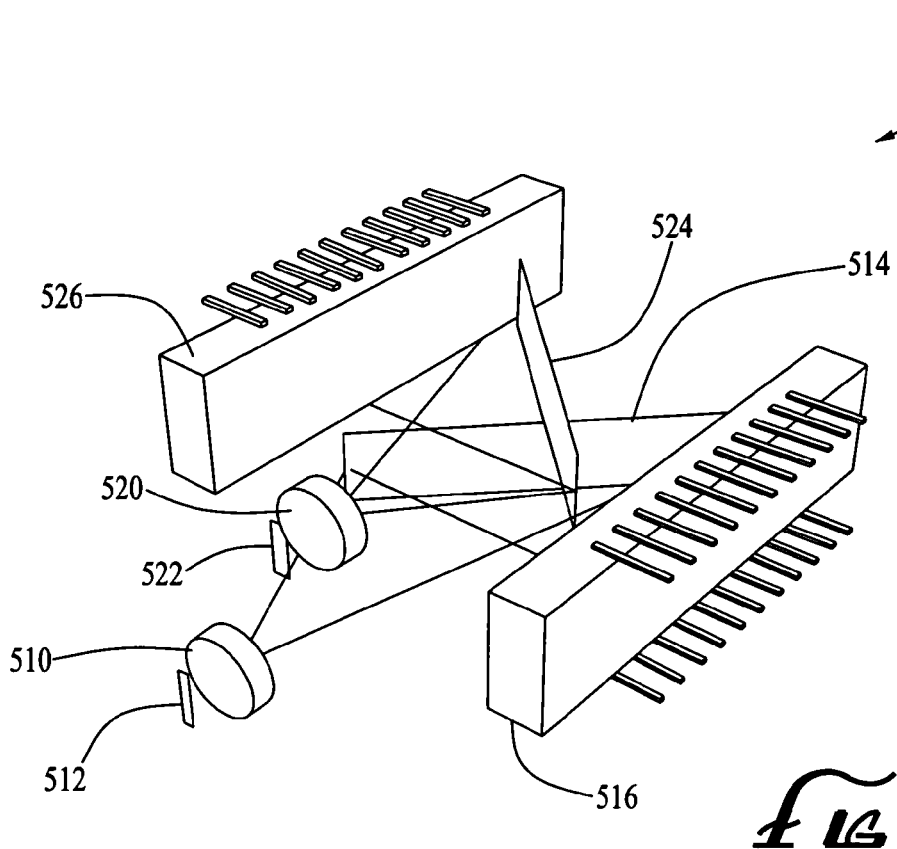

Typically the arrays illustrated in the previous embodiments are linear in geometry such as the arrays 516, 526 illustrated in FIGS. 10 and 11.

Another alternate multiple sensor imaging collection system 500 is illustrated in FIGS. 10-11. An incoming image of a barcode for example is passed through a slit or aperture 512 and is focused via a first collection system, shown as a lens 510, along an incoming optical path toward a fold mirror 514 which reflects the image and onto the first CCD array 516. Another image of that same barcode is passed though slit or aperture 522 and is collected by a second collection system, shown as a lens 520, which focuses the image along an incoming optical path and toward a second fold mirror 524, and then onto a second CCD array 526. The lenses 510, 520 are vertically offset (as shown in FIG. 11) and longitudinally offset (as shown in FIG. 10). The lenses 510, 520 focus a linear image of the barcode toward the elongated fold mirrors 514, 524 so that a section of an entire width of the bar code is imaged onto the detectors 516, 526. As in previous embodiments, the lens systems 520, 520 focus to different fields due to differing axial position (e.g. lens 510 is nearer to the target) and/or different optical lens power. The lenses 510, 524 may have the same optical power (and preferably are the same for ease of manufacture) but may provide different focal fields due to the differing axial location. The fold mirrors 514 and 524 are elongated corresponding to a section of a barcode being imaged onto the linear CCD arrays 516, 526. The mirrors 514, 524 are arranged generally perpendicular and stacked vertically. The first CCD array 516 and second CCD array 526 are arranged facing in opposite directions, but may be offset vertically for alignment with respective fold mirrors 514, 524.

Figure 12:
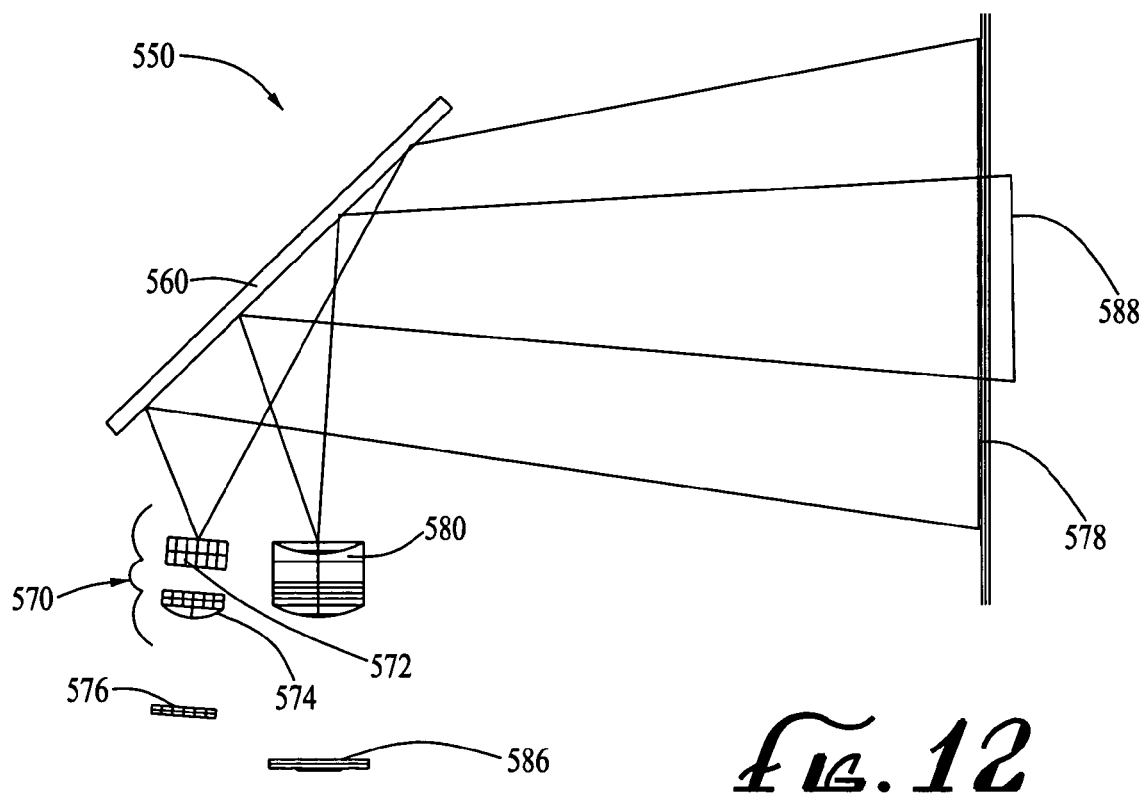
FIG. 12-14 are schematic diagrams illustrating an imaging system according to another alternate embodiment, FIG. 12 being a side view, FIG. 13 being a perspective view, and FIG. 14 being a rear view.
Figure 13:
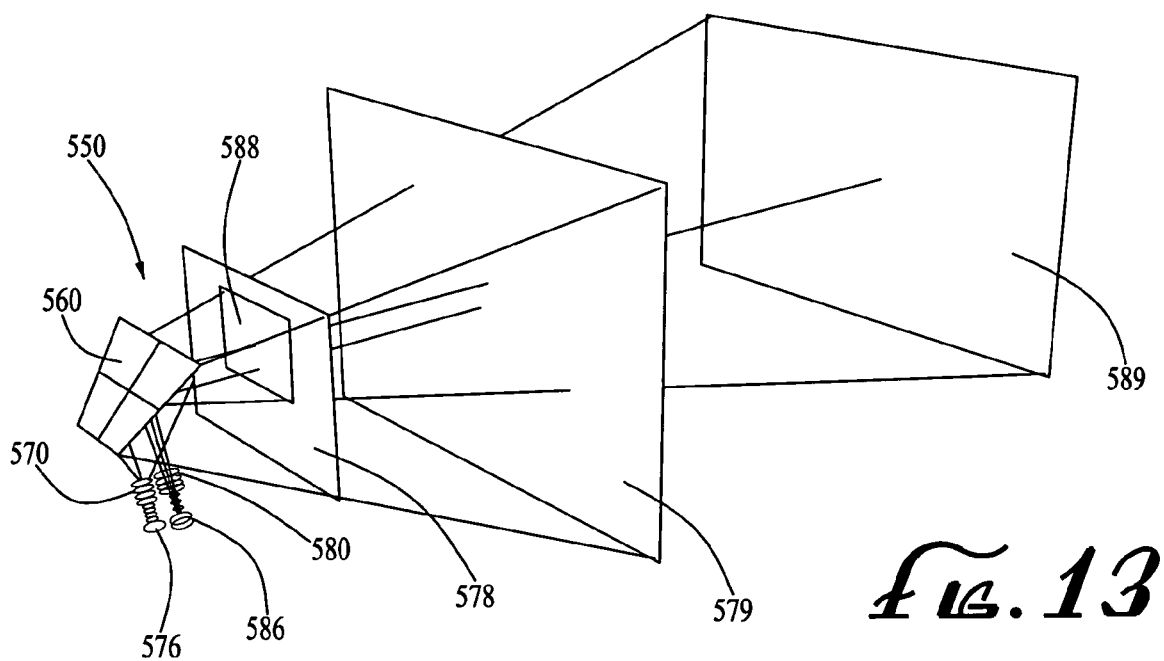
Figure 14:
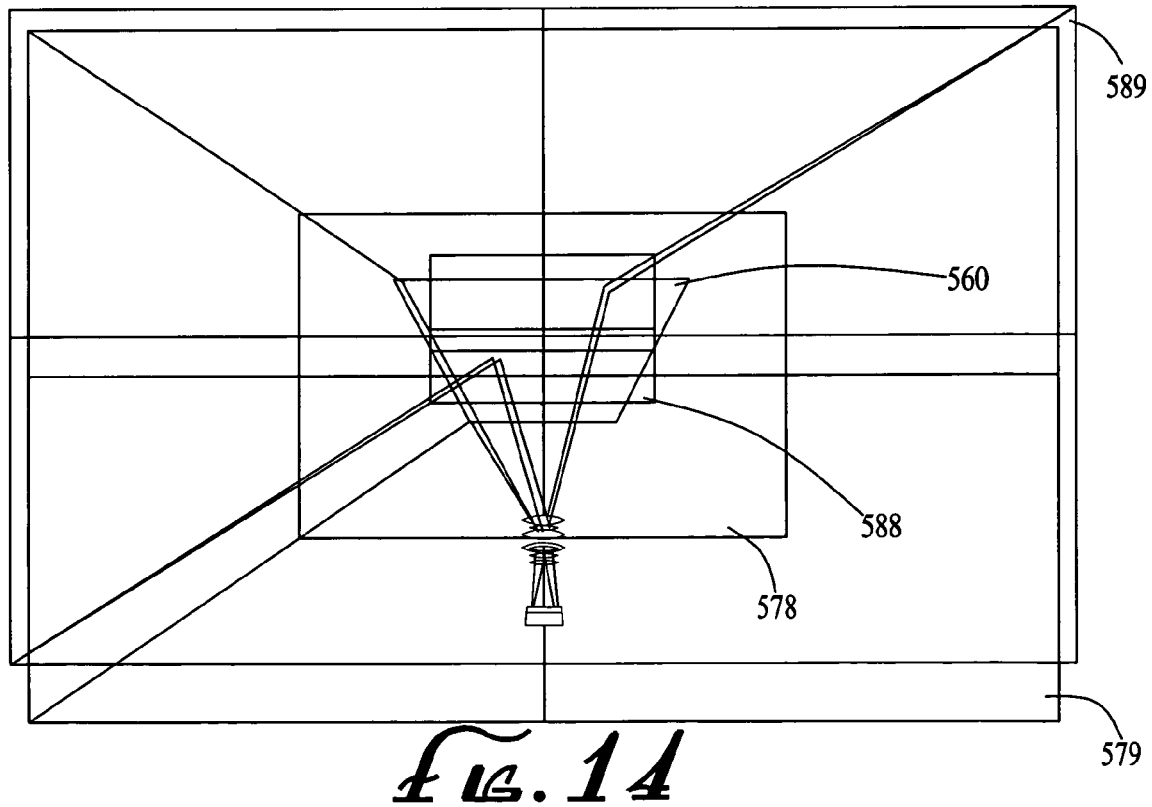

Yet another alternate multiple sensor imaging collection system 550 is illustrated in FIGS. 12-14. An incoming image of a barcode for example is first reflected off a common fold mirror 560 toward the multiple collection systems. The first collection system 570 comprises a wide field imager, including lens sections 572 and 574, focusing an image reflecting off fold mirror 560 onto sensor array 576. The second collection system comprised of lens 580 is a more standard field imager with a longer focal length, focusing an image reflecting off the fold mirror 560 and onto the sensor array 586. As shown in the figures, the first collection system 570 produces a wide field of view 578 and 579 in the near fields. The second collection system 580 has a longer focal length and produces a more narrow field of view 588 for the near field reading and a more narrow field of view 589 for far field reading.

The collection lens systems 570, 580 have axes which are offset but aligned as shown in the rear view of FIG. 14. The axes of the lenses 570, 580 are not necessarily parallel, each axis being oriented to achieve a desired overlapping image fields.

In each of the embodiments, the collection systems may comprise a lens system comprised of one or more optical elements such as lenses, prisms, mirrors, holographic elements, apertures, gratings. The lens elements may be single focal or multifocal such as described in U.S. Pat. No. 5,814,803 incorporated by reference, or may include active focusing mechanism such as a movable focusing lens element.

The data reading systems may be implemented for a handheld reader 150 as illustrated in FIG. 2 for portable operation, or may comprise a fixed reader such as may be used for presentation scanning. Alternately, the reader may comprises a portable unit operable for multi-mode operation being operable in either a fixed mode and a handheld mode. The switch may comprise either a manually actuated switch on the housing or alternately a sensor which senses when the reader is moved (using a motion sensor or accelerometer) or is grasped by the operator (such as a contact sensor). Upon sensing that the reader has been moved or grasped, the reader may switch into handheld mode.

The aiming mechanism may apply to either handheld or fixed mode. When operating in handheld mode, the operator uses the aiming pattern to assist in moving the data reader to position the aiming pattern onto the optical code. In the fixed mode of operation, the operator moves the item to place the optical code into the scan region and thereby positions the aiming pattern onto the optical code.

While the invention has been particularly shown and described with reference to certain embodiments, it will be understood by those skilled in the art that various changes in form and detail may be made without departing from the spirit and scope of the invention.

What is claimed is:

1. An optical reader for reading an optical code disposed within a read volume, comprising
    a first detector comprising a first two-dimensional sensor array;
    a first light collection system for collecting light along a first collection path and onto the first detector;
    a second detector comprising a second two-dimensional sensor array;
    a second light collection system for collecting light along a second collection path offset from the first collection path;
    a stationary, non-curved planar fold mirror for directing incoming light toward both the first and second detectors,
    wherein each of the first and second collection systems produces an image focus, the image focuses being at different distances from the optical reader, and wherein the optical reader comprises an imaging reader projecting an image of an entire optical code onto each of the first and second two-dimensional sensor arrays.

2. An optical reader for reading an optical code disposed within a read volume, comprising
    a first detector comprising a first sensor array;
    a first light collection system for collecting an image of at least a portion of an optical code along a first collection path and onto the first sensor array;
    a second detector comprising a second sensor array;
    a second light collection system for collecting an image of at least a portion of the optical code along a second collection path offset from the first collection path and onto the second sensor array, the first detector and the second detector being arranged back-to-back, facing in opposite directions, wherein the first and second collection systems producing an image focus at different distances.

3. An optical reader according to claim 2 further comprising a printed circuit board, wherein the first detector and the second detector are mounted on opposite sides of the printed circuit board.

4. An optical reader according to claim 2 wherein the first detector comprises a first COD and the second detector comprises a second CCD.

5. An optical reader according to claim 2 wherein the first light collection system comprises a first collection lens and the second light collection system comprises a second collection lens, the first and second collection lenses having different focusing distances from the optical reader but with overlapping depths of field.

6. An optical reader according to claim 2 further comprising an aiming system for projecting an aiming pattern into the read volume.

7. An optical reader according to claim 2 wherein the light focused onto the first and second detectors while reading the optical code is comprised solely of ambient light, the optical reader not including means for illuminating the optical code while reading.

8. An optical reader according to claim 2 further comprising an illumination source within the optical reader for illuminating the optical code while reading.

9. An optical reader according to claim 2 wherein the optical reader comprises an imaging reader projecting an image of an entire optical code onto each of the first and second sensor arrays.

10. An optical reader according to claim 9 wherein the light focused onto the first and second detectors while reading the optical code is comprised solely of ambient light, the optical reader not including means for illuminating the optical code while reading.

11. An optical reader according to claim 9 an illumination source within the optical reader for illuminating the optical code while reading.

12. An optical reader according to claim 2 further comprising a laser light source producing a laser beam and a scanning mechanism for scanning the laser beam in a desired pattern within the scan volume.

13. A method for reading optical codes using an optical reader, comprising the steps of:
    acquiring a two-dimensional image of a scan region into a first sensor array;
    acquiring a two-dimensional image of a scan region into a second sensor array, wherein the first sensor array and the second sensor array are arranged back-to-back, facing in opposite directions within the optical reader and focused at different distances from the optical reader.

14. A method according to claim 13 further comprising illuminating the images acquired solely via ambient light.

15. A method according to claim 14 further comprising projecting an aiming pattern onto a target being read for assisting an operator in positioning an optical code at a desired location relative to the optical reader.

16. A method for optical code reading using an optical reader, comprising the steps of:
    directing incoming light from a scan region off a stationary, non-curved planar mirror and onto a first tow-dimensional sensor array and a second two-dimensional sensor array;
    forming a first two-dimensional image of a scan region onto the first two-dimensional sensor array and detecting the first two-dimensional image;
    forming a second two-dimensional image of the scan region onto the second two dimensional sensor array and detecting the second two-dimensional image, the first two-dimensional image and the second two-dimensional image being focused at different distances into the scan region.

17. A method according to claim 16 further comprising
    illuminating the optical code with an illumination source;
    generating an aiming pattern by a light source separate from the illumination source.

18. A method according to claim 17 wherein the method for optical reading comprises a handheld mode of operation, wherein an operator aims a handheld data reader at the optical code for positioning the aiming pattern onto the optical code.

19. A method according to claim 17 wherein the method for optical reading comprises a fixed mode of operation, wherein an operator moves an item bearing the optical code within the scan region for positioning the aiming pattern onto the optical code.

20. A method according to claim 16 wherein the optical reader comprises a portable unit selectively operable in a fixed mode and a handheld mode of operation.

21. A method for optical code reading using an optical reader, comprising the steps of:
   providing the optical reader with a first two-dimensional sensor array and a second two-dimensional sensor array, the arrays arranged back-to-back, facing in opposite directions;
   forming a first image of a scan region onto the first two-dimensional sensor array and detecting the image;
   forming a second image of the scan region onto the second two dimensional sensor array and detecting the image, the first and second images being focused at different distances into the scan region and having overlapping depths of field.

22. A method for optical code reading using an optical reader, comprising the steps of:
   providing the optical reader with a first sensor array and a second sensor array, the arrays arranged face-to-face;
   forming a first two-dimensional image of a scan region onto a first two-dimensional sensor array and detecting the image;
   forming a second two-dimensional image of the scan region onto a second two dimensional sensor array and detecting the image, the first and second images being focused at different distances into the scan region and having overlapping depths of field.

23. An optical reader comprising
   a first detector comprising a first two-dimensional sensor array;
   a first light collection system for collecting light along a first collection path and onto the first detector;
   a second detector comprising a second two-dimensional sensor array;
   a second light collection system for collecting light along a second collection path offset from the first collection path,
   wherein each of the first and second collection systems produces an image focus, the image focuses being at different distances from the optical reader, and wherein the optical reader comprises an imaging reader projecting an image of an entire optical code onto each of the first and second detectors,
   wherein the first detector and the second detector are arranged back-to-back, facing in opposite directions.

24. An optical reader for reading an optical code disposed within a read volume, comprising
   a first detector comprising a first two-dimensional sensor array;
   a first light collection system for collecting light along a first collection path and onto the first detector;
   a second detector comprising a second two-dimensional sensor array;
   a second light collection system for collecting light along a second collection path offset from the first collection path,
   wherein the optical reader comprises an imaging reader projecting a two-dimensional image of an entire optical code onto each of the first and second detectors,
   wherein the first detector and the second detectors are arranged face-to-face.

25. An optical reader according to claim 24 further comprising a printed circuit board, wherein the first detector and the second detector are mounted on the printed circuit board.

26. An optical reader according to claim 1 further comprising a printed circuit board, wherein the first detector and the second detector are mounted on the printed circuit board.

27. An optical reader according to claim 2 wherein the first detector is arranged in a plane parallel to the first collection path.

28. An optical reader according to claim 2 wherein the first detector is arranged in a plane perpendicular to the first collection path.

29. An optical reader according to claim 2 wherein the first detector and the second detector being arranged proximate to each other, back-to-back facing in opposite directions such that the first detector faces away from the second detector and the second detector faces away from the first detector.

30. An optical reader according to claim 29 wherein the first detector and the second detector are laterally offset from one another.

31. An optical reader according to claim 24 wherein the first detector and the second detector being arranged proximate to each other, face-to-face facing in opposite directions such that the first detector faces toward the second detector and the second detector faces toward the first detector.

* * * * *

UNITED STATES PATENT AND TRADEMARK OFFICE
CERTIFICATE OF CORRECTION

PATENT NO. : 7,490,770 B2
APPLICATION NO. : 10/918193
DATED : February 17, 2009
INVENTOR(S) : Alan Shearin It is certified that error appears in the above-identified patent and that said Letters Patent is hereby corrected as shown below:

Column 1
Line 37, before "typically" delete "a".

Column 2
Line 6, before "an" delete "the".
Line 49, before "alternate" change "a" to --an--.
Line 64, before "12-14" change "FIG" to --FIGS--.

Column 3
Line 65, before "two-dimensional" insert --a--.
Line 66, before "imaging" change "a" to --an--.

Column 4
Line 66, before "aligned" insert --be--.

Column 5
Line 63, before "aligned" insert --be--.

Column 6
Line 7, change "though" to --through--.
Line 17, after "systems" change "520" to --510--.
Line 48, change "fields" to --field--.
Line 59, change "comprises" to --comprise--.
Line 61, change "and" to --or--.

Column 7
Line 55, change "COD" to --CCD--.

Column 8
Line 16, before "an illumination" insert --further comprising--.
Line 42, change "tow" to --two--.

UNITED STATES PATENT AND TRADEMARK OFFICE
CERTIFICATE OF CORRECTION

PATENT NO. : 7,490,770 B2
APPLICATION NO. : 10/918193
DATED : February 17, 2009
INVENTOR(S) : Alan Shearin It is certified that error appears in the above-identified patent and that said Letters Patent is hereby corrected as shown below:

Column 10
Line 17, after "second" change "detectors" to --detector--.

Signed and Sealed this

Seventh Day of July, 2009

JOHN DOLL
*Acting Director of the United States Patent and Trademark Office*